United States Patent [19]
Carey

[11] Patent Number: 6,019,067
[45] Date of Patent: Feb. 1, 2000

[54] ANIMAL RESTRAINT STORAGE RECEPTACLE

[75] Inventor: Freddie Carey, Richfield, Minn.

[73] Assignee: Cider Mill Farms Co., Inc., Fitchburg, Mass.

[21] Appl. No.: 08/543,187

[22] Filed: Oct. 13, 1995

[51] Int. Cl.⁷ .................................................. A01K 27/00
[52] U.S. Cl. ............................................................ 119/795
[58] Field of Search ..................... 119/792, 793, 119/795, 797; D30/153

[56] References Cited

U.S. PATENT DOCUMENTS

| | | | |
|---|---|---|---|
| D. 374,518 | 10/1996 | McIntyre | D30/153 |
| 1,657,250 | 1/1928 | Fetters . | |
| 4,178,879 | 12/1979 | Cunningham | 119/858 |
| 5,184,762 | 2/1993 | Nevitt | 119/858 |
| 5,355,839 | 10/1994 | Mistry | 119/858 |
| 5,363,809 | 11/1994 | Roe | 119/858 |
| 5,429,075 | 7/1995 | Passarella et al. | 119/795 |
| 5,441,017 | 8/1995 | Lindsay | 119/795 |

FOREIGN PATENT DOCUMENTS

| | | | |
|---|---|---|---|
| 684045 | 7/1994 | Liechtenstein | 119/795 |

Primary Examiner—Michael J. Carone
Assistant Examiner—Elizabeth Shaw
Attorney, Agent, or Firm—Wechsler & Wechsler, P.C.; Lawrence I. Weschsler

[57] ABSTRACT

An article-carrying receptacle for attachment to a leash includes a body portion for holding articles placed therein while providing access to the contents thereof by a free hand of the individual holding the handle portion of the leash in a remaining hand. The receptacle is supportingly securable to the leash for use in a manner permitting one-hand operation of the entry closure by the free hand. In an advantageous embodiment the receptacle body portion is in the form of an elongated pouch, receivable in a position proximal a handle portion of a leash, or mounted directly thereto, in the longitudinal direction. A closable opening is conveniently provided along the length of the receptacle for accessing the interior thereof, positioned to provide access by a free hand of the individual. In another embodiment, a combination of a receptacle, and a handle portion of a leash on which the receptacle is received includes a triangularly configured handle portion, advantageously having the shape of either a substantially isosceles or substantially right triangle.

9 Claims, 3 Drawing Sheets

ANIMAL RESTRAINT STORAGE RECEPTACLE

BACKGROUND OF THE INVENTION

The present invention relates generally to pet accessories used in connection with leashed animals, commonly including, for example, dogs and cats, and more particularly to an enclosed receptacle mounted on a hand-held animal restraint for storing and providing easy access to various articles during walking of the animal.

With the advent of so-called "pooper-scooper" ordinances promulgated by many municipalities in response to public concerns about health and social concerns, a pet owner within these jurisdictions is required to collect and properly dispose of solid waste produced by their dog while in the public venue. This requirement has imposed upon the pet owner the need to carry means for accomplishing this end in a sanitary fashion, conveniently in the form of bags or gloves, preferably made of rubber, plastic of other non-porous flexible material, for shielding the hands of the user. Such articles may be intentionally carried by the owner during walks scheduled for purposes of giving the animal the opportunity to relive itself. However, at other times, such as during pleasure walks or when accompanied by a dog while jogging or cycling, a pet owner, not anticipating the need for sanitary implements, will not have a supply of such items at hand should the unexpected need to clean up after the dog arise.

When walking dogs or other leashed animals, it is often also desirable to have, at hand, other miscellaneous personal articles which the owner may wish to have within easy reach at such time in addition to items dedicated to sanitation as described above, without the need for openly carrying same. It is not uncommon at times of such walks with his pet, that a pet owner may be wearing other than his usual clothing since such outings are often conducted during early morning or late night hours, or during a workout, at which times shorts, or other clothing appropriate to the particular exercise, are worn. At such times, the owner may wish to temporarily store house keys, sunglasses, cigarettes, money, personal identification or the like in a manner convenient for carrying during the walk, within a holding receptacle which provides ready access to the contents thereof. The ability to store and effectively permit retrieval of a hand-held repellent spray for fending off other animals or attackers, may also be a feature desired by the user of such product.

Others in the art have heretofore addressed the need for providing a storage article which would, among other things, assure a reliable supply of sanitary aids at all times during a leashed outing of a dog or other animal. One such proposed solution to the above stated problem was set forth in U.S. Pat. No. 5,363,809 issued to Roe on Nov. 15, 1994. The article disclosed in such patent comprises a disposable bag carrier or receptacle for attachment to a pet collar, the carrier having the decorative appearance of a bow. The bow-shaped carrier is knotted in the center, providing two outwardly extending sheathed portions, distal ends of which are open, providing two pouch compartments within the carrier for holding disposable bags. The open ends are sealable by a hook and loop type fabric fastening system, permitting access to the contents stored therein when desired, and preventing loss thereof at other times. Although effectively providing an attractive means for storing and dispensing sanitation articles reliably, on an as needed basis, the disposition of the carrier on the collar does not readily provide access to the owner located some distance down the lead, or running, portion of the leash. Where the leash length is greater than arms length, it is necessary first to manually restrain the dog to retrieve the contents of the receptacle, which requirement may be inconvenient or wholly unacceptable, particularly, for example, with regard to storage of repellant sprays.

In another attempt to integrate storage capabilities with a dog restraint, U.S. Pat. No. 5,184,762 issued to Nevitt on Feb. 9, 1993 describes a harness capable of carrying, at various points thereon, at least one receptacle adapted to receive for example a beverage container. This provides a satisfactory means by which an item my be stored for access whenever the dog or animal is wearing the harness. However, like the aforementioned article, the user is required to be in proximate range of the dog, and the dog held somewhat stationary, in order to effectively gain access to the contents of the receptacle.

Despite other similar attempts to provide a storage article used in connection with a leashed outing with a dog or other animal, nothing has heretofore been proposed which adequately addresses the need to provide a storage receptacle integral with an animal restraint which provides convenient and ready access to a contents thereof, within easy reach of the user.

OBJECTS AND SUMMARY OF THE INVENTION

Accordingly, it is an object of the invention to provide an article storage receptacle for use during leashed outings which overcomes the drawbacks of the prior art.

It is a further object of the invention to provide the article storage receptacle in a form which permits access to a contents thereof, and which is disposed within easy reach of the user.

It is a still further object of the invention to provide the article storage receptacle in a portable, light-weight, easy to handle configuration.

It is a yet a further object of the invention to provide the article storage receptacle in a form which may be economically produced and which also provides aesthetic appeal.

Briefly stated, there is provided an article-carrying receptacle for attachment to a hand-held animal restraint, i.e. a leash, advantageously in a position proximate a handle portion thereof. The receptacle will include a body portion including structure providing means for holding articles placed therein while providing access to the contents thereof by a free hand of the individual holding the handle portion of the leash in a remaining hand. Such body structure may provide for enclosed, fully bounded containment, which includes a sealable means for entry, conveniently supplied, for example, in the form of a zippered slot on a side thereof. Alternatively, the body portion of the receptacle may be of partially open construction providing means for retaining articles, in a partially exposed manner, for example a pouch open at the top for receiving at least lower portions of the articles. The receptacle may be of rigid or flexible construction, or a combination of both, comprised for example, of a variety of suitable plastics or fabrics. Means are provided for mounting the receptacle to the leash. Advantageously, the body portion of the receptacle is stably and supportingly secured to the leash for use in a manner permitting one-hand operation of the entry closure means by the free hand. Such provision is believed also to incidentally inhibit deformation of the receptacle created by varying direction and degree of tension extended along the running portion of the leash when in mounted position during use.

The receptacle may be received in permanently mounted engagement with the animal restraint, or be attached thereto for removal and replacement as desired.

In an advantageous embodiment in accordance with the invention, the receptacle body portion is in the form of an elongated pouch, receivable in a position proximal a handle portion of a leash, with a longitudinal axis thereof approximately aligned with an extended running portion of the leash. For purposes of this disclosure, "proximal" is defined as a distance within a maximum reach of a free hand of an individual while holding the leash handle portion in a remaining hand, i.e. roughly the distance by which the hands of a user are apart when fully extended in opposed directions. A slotted opening is provided along the length of the receptacle to provide convenient means for accessing the interior thereof, positioned to provide access by a free hand of the individual, optimally on a lateral side thereof facing in a direction corresponding to that of the free hand. Means are provided for selectively closing the entry slot, conveniently in the form of a zipper or other suitable equivalent closure means used for such purposes. Advantageously, the elongated receptacle is mounted to the leash in such manner preventing significant separation between the leash and elongated pouch at a forward and rear end of the pouch. In this manner, with the running portion of the leash under tension, the pouch receptacle is stably supported to permit unassisted one-hand operation of closure means by the free hand.

In a particularly advantageous embodiment, the receptacle is designed for reception on the handle portion of the leash itself, for convenient orientation directly below the handle portion. The receptacle includes mounting means for secure attachment to the handle portion, providing inhibited lateral or rotation movement with respect to the location of attachment. By virtue of such configuration, when the handle portion is gripped in one hand, the pouch receptacle is restrained from movement with respect thereto, further facilitating one-hand operation by the remaining free hand of the individual for convenient access to the contents, even when the running portion of the leash is not under tension.

In another embodiment, a combination of a receptacle, and a handle portion of a leash on which the receptacle is received in mounted position, is thought to discourage deformation of the receptacle, and provide stable and comfortable control of the dog. The handle portion is triangularly configured, a first and a second side thereof diverging from said running portion, and a third side connecting the first and second sides including a grip region. An elongated receptacle is mounted to the handle portion along the third side connecting the ends of the aforementioned sides, optimally oriented longitudinally with respect thereto and advantageously running the length thereof. The receptacle is conveniently of pouch-like soft construction, including a zippered entry disposed on a side facing the free hand of the individual.

In an advantageous embodiment of a receptacle and leash handle combination, a triangularly configured handle portion as described above is in the form of a substantially isosceles triangle, wherein the first and second sides which diverge from the end of a leash running portion are of substantially equal length, and the third side along which a grip is provided serves as the base thereof. "Substantially isosceles" is defined as having base angles differing from one another by no more than 10°. Such configuration permits substantially equal distribution of tensioning forces through each of the first and second forwardly disposed sides when the grip region is oriented substantially perpendicular with the leash running portion.

In a particularly advantageous embodiment, a triangularly configured handle portion includes a forwardly disposed side which is an extension of the running portion of the leash. A rearwardly disposed side adjacent thereto provides a grip region, and is oriented at a substantially right angle with the forwardly disposed side. An elongated receptacle is mounted to the handle portion along the hypotenuse of the substantially right triangular configuration, which connects the rearwardly disposed grip region to the forward end of the forwardly disposed side at its point of origin from the leash running portion. The receptacle is optimally oriented longitudinally with respect to the hypotenuse and advantageously runs the length thereof. The receptacle is conveniently of pouch-like, soft construction, including a zippered entry disposed on a side facing the free hand of the individual. For disclosure purposes, "substantially right" or "substantially perpendicular" defines an angular relationship in a range from about 800 to about 1000. This configuration is believed to provide superior handling comfort and greater functional stability by virtue of the force directing geometry of the handle portion. Anatomically, with arm extended and the hand in gripped position, wrist held straight, a line formed by the gripping fingers is substantially perpendicular to the line formed by the extended arm. Therefore, by holding the handle portion with the forwardly disposed side aligned with the leash running portion as a linear extension thereof, as tension is applied to the running portion of the leash, forces are directed up through the leash, and transmitted primarily through the extended forwardly disposed side, to the gripping region disposed on the side rearwardly adjacent to and at a substantially right angle therewith. When so positioned, the extended arm of the individual is in general alignment with the vector of tensioning forces extending through the running portion of the leash. Such configuration is thought not only to provide greater comfort, but also to provide resistance against significant deformation of the pouch, should the direction of applied tension be shifted by a change in the direction of the dog, or a twisting motion of the handle portion effected by the user.

In both of the above triangularly configured handle and receptacle combinations, where the handle portion is made of flexible leash material, the grip region will include means for preventing bending along a length thereof, conveniently provided, for example in the form of a dowel integral with the constructed handle portion. Such partially rigid structure permits more reliable transfer of forces in desirable manner as described above, and is more comfortably held on the hand.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
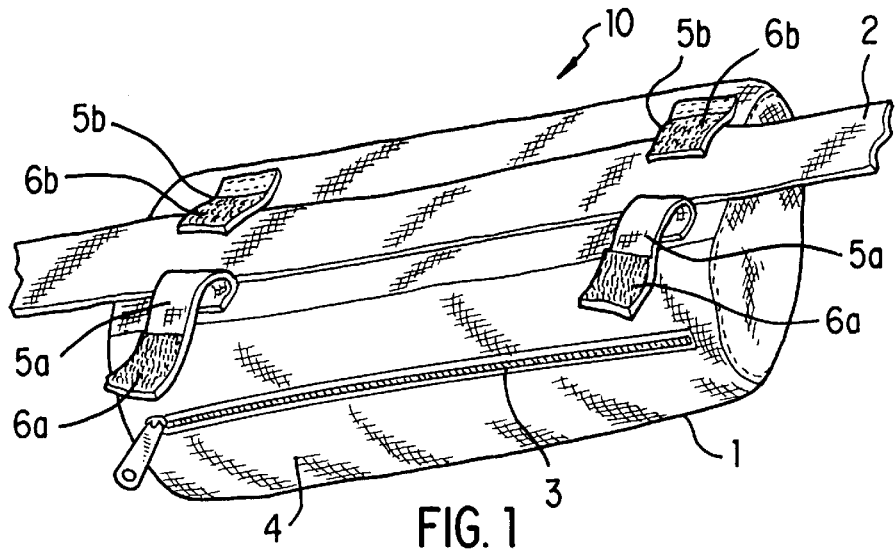
FIG. 1 is a perspective view of an embodiment of the article receptacle in accordance with the invention.

Referring now to the figures, and in particular FIG. 1 there is depicted, in accordance with the invention an article-carrying receptacle for attachment to an animal restraint, generally designated 10. In its broadest sense, receptacle 10 will include a body portion 1 having structure providing a space for holding articles therein when carried on a leash 2. Such structure may provide for enclosed, fully bounded containment which includes a sealable means for entry, as depicted in FIG. 1, for example in the form of a zippered slot 3 on a side 4 of body portion 1. Body portion 1 may be a fully bounded, elongated flexible structure, for example as shown, fabricated from a suitable material, for example one of the many woven synthetic or natural fiber fabrics generally used in various articles of luggage. These materials possess good aesthetic appearance and durability, and are easily sewn together to produce a desired three dimensional body structure by conventional stitching equipment. Alternatively, a receptacle body portion may include any one of a number of structural configurations different than that of receptacle 10 depicted in FIG. 1, such other body portion configurations being contemplated within the scope of the invention. For example, a receptacle body portion may be of partially open construction providing alternative means for holding articles, for retainment in a partially exposed manner. Such receptacle could include as a body portion a pouch open at the top and bounded by elastic means at the opening, the pouch for receiving and retaining at least lower portions of the articles. Additionally, body portion 1 may alternatively comprise a rigid structure, composed of plastic or other like material, produced by a molding or other suitable process. When produced in accordance with the depicted embodiment, however, nylon cordura having a thread weight of about 1,000 denier has been used for fabrication of the enclosed body portion of receptacle 10 with satisfactory results, advantageously providing a desirable appearance, as well as a good degree of strength and stiffness.

Means are provided for mounting receptacle 10 to leash 2, for example, conveniently in the form of a pair of cooperating tabs 5a and 5b each carrying hook and loop type fastening means on surfaces opposed to one another, configured to permit them to be brought together in overlapping arrangement. Leash 2 is placed below tabs 5a and 5b located at both ends of elongated body portion 1, and the pair of tabs 5a and 5b brought together in overlapping engagement. Frictional forces between leash 2 and body portion 1 from below, and tabs 5a and 5b from above, inhibit longitudinal and lateral movement of receptacle 10 on leash 2. Although not necessary to the invention, as depicted in the embodiment, leash 2 is advantageously a strap of flattened construction, which, when captively received between tabs 5a and 5b and a top surface of body portion 1, provides a convenient means for inhibiting rotation about leash 2. Use of a 1" nylon web strap for construction of leash 2, has been found, for example, to work effectively.

Figure 2:
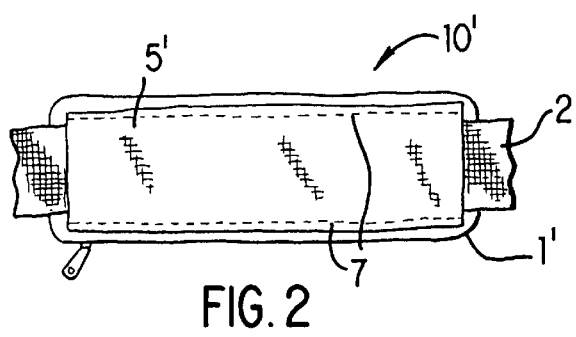
FIG. 2 is a plan view of an embodiment of the article receptacle in accordance with the invention adapted to permanent mounting on a leash.

Means other than the above described example may alternatively be employed for mounting the receptacle 10 to leash 2 without departure from the invention, provided such means stably secure receptacle 10 to leash 2 in a preferred manner inhibiting substantial movement of body portion 1 on leash 2, thereby facilitating one-hand operation of the entry closure means by the free hand. Use of tabs 5a and 5b provides a means for attachment of receptacle 10 to leash 2 in a manner permitting removal and replacement as desired. It is noted that such removability permits a user to mount receptacle 10 in either of two longitudinal directions on leash 2, which in turn orients zippered slot 2 either facing the left or right of the user when holding leash 2. Such feature accommodates the needs of both right and left handed individuals, without requiring a particular leash/receptacle combination dedicated to one or the other. Alternatively however, it is contemplated that receptacle 10 may be received in permanently mounted engagement with leash 2, for example, when commercially offered as a leash/receptacle combination, an example of which is shown in FIG. 2. In such instance the product will either be offered in a choice of both right and left-handed models, or body portion 1 provided with two access openings, for example zippered slots 3, disposed on both of opposed elongated sides 4 of body portion 1, to permit alternate directional entry to the contents thereof as desired. Utilizing two zippered slots 3, or a pair of other entry means disposed in equivalent manner, is particularly advantageous when, for example, two individuals, each favoring different sides, share the responsibility of walking the dog or other animal, or when the user is desirous of alternating the hand in which leash 2 is gripped during an outing.

Referring to FIG. 2, a receptacle 10' includes a body portion 1' fashioned in accordance with the guidelines set forth with regard to the description of the aforementioned embodiment pictured in FIG. 1. Means are provided for mounting body portion 1' to a leash 2 in a manner which does not permit removal therefrom, conveniently in the form of a strap holder 5' stitched to a top of body portion 1' by a row of stitching 7 along both lateral sides of strap holder 5', between which a leash 2 is slidably received. Leash 2 is advantageously of strap-shaped configuration, as shown, to assist in preventing rotation of body portion 1' about leash 2. Friction between leash 2 and the contacting surface of strap holder 5' and the top of body portion 1' inhibits longitudinal sliding movement of body potion 1' along leash 2, unless intentionally pushed forcibly by hand to achieve a desired positioning thereof for use.

Figure 3:
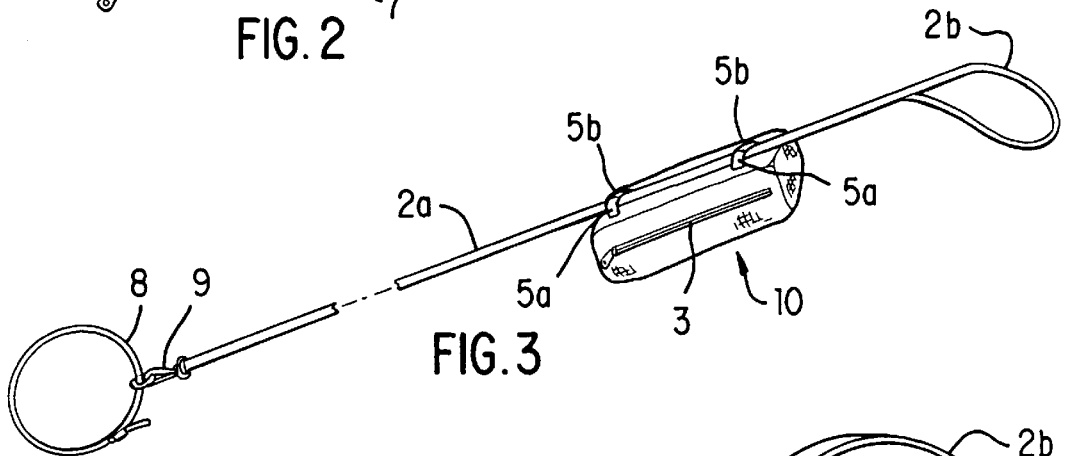
FIG. 3 is a perspective view of the article receptacle of FIG. 1 shown in mounted position along a running portion of a leash.

Turning now to FIG. 3, receptacle 10 of the general form shown in FIG. 1 is illustrated in mounted position, depicting a one possible mounting location along leash 2 within the intended scope of the invention. Leash 2 includes a running portion 2a, removably connected at one end to a collar 8, conveniently accomplished by means of a swivel catch 9 carried on said end. Running portion 2a of a desired length extends to a handle portion 2*b*, disposed at an end of leash 2 opposite the end thereof connected to collar 8. Receptacle 10 may be mounted anywhere along running portion 2*a* and on handle portion 2*b*, within the intended scope of the invention. Advantageously, however, receptacle 10 is mounted in a position along leash 2 proximal handle portion 2*b*, as depicted for example in FIG. 3. As noted prior herein, "proximal" is defined for purposes of disclosure as a location within reach of a hand of a user when a grip is maintained by another hand on handle portion 2*b*. For practical purposes, this will be arms length, however by reaching backward with the arm of the gripping hand, the distance may be as great as the user's armspan. Mounting receptacle 10 such a distance from handle portion 2*b* facilitates access to receptacle contents by a free hand of the user while holding leash 2 in the other.

Figure 4:
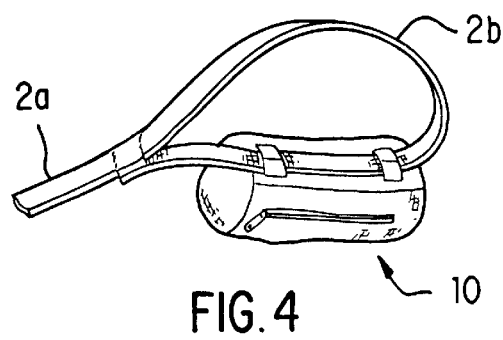
FIG. 4 is a perspective view of the article receptacle of FIG. 1 shown in mounted position at a handle portion of a leash.

FIG. 4 depicts an embodiment in which receptacle 10 is mounted at handle portion 2*b*, conveniently attached thereto for orientation of receptacle body portion 1 below handle portion 2*b*. Such location advantageously permits unobstructed reception of a hand through handle portion 26, and optimizes the stability of body portion 1 by virtue of such configuration. When handle portion 2*b* is gripped in one hand, movement of receptacle body portion 1 is significantly limited, facilitating one-handed access to article stored therein by the other hand of the user, providing particular advantage in circumstances where running portion 2*a* of leash 2 is not under tension.

Figure 5:
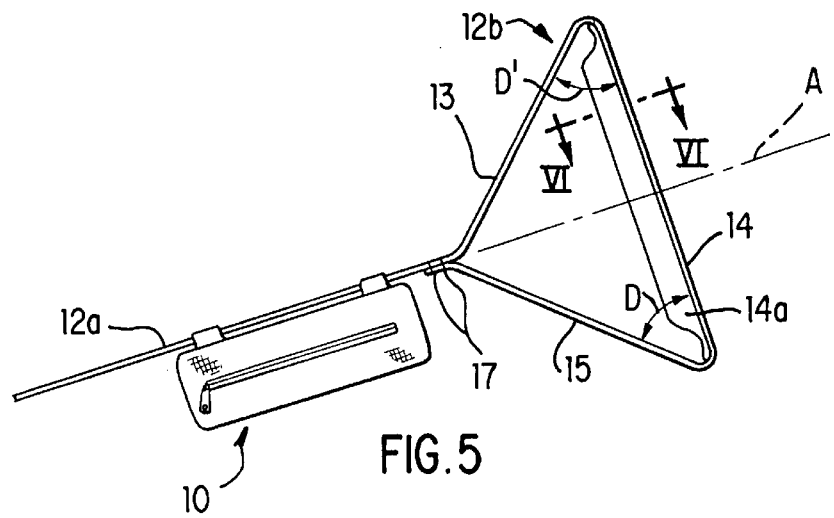
FIG. 5 is a side view of an article receptacle and leash combination depicting an advantageous handle portion embodiment in accordance with the invention, in which the receptacle is mounted to the leash running portion.
Figure 6:
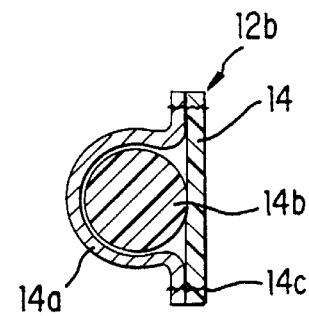
FIG. 6 is cross-sectional view taken at line VI—VI detailing construction the grip portion of the leash handle portion.

Turning now to FIG. 5, an embodiment in accordance with the invention is shown in which receptacle 10, configured generally as described with respect to FIG. 1, is mounted to a leash 12, for example on a leash running portion 12*a* disposed in close proximity to a leash handle portion 12*b*. Handle portion 12*b* is triangularly configured, and includes a first side 13 and a second side 15 diverging from an end of running portion 12*a*, and a third side 14 connecting the first and second sides 13 and 15. When in use, third side 14 of handle portion 12*b* is gripped. In order to retain the aforementioned triangular configuration, handle portion 12 may be comprised of rigid structure formed by molding or fabrication in such desired shape from suitable material, such as for example plastic or metal. Alternatively, as depicted in the figures, handle portion 12*b* is conveniently comprised of flexible material, conveniently the same material as a remainder of leash 12. For example, during manufacture of leash 12, an end of a continuous length of suitable leash material may be formed into a loop defining handle portion 12*b*, and the end fastened to leash 12 at a point defining the end of running portion 12*a*, conveniently accomplished by means of stitching 17. Where handle portion 12*b* is fashioned in such flexible manner, a triangular configuration is maintained by providing rigidity to third side 14, conveniently for example by a support member disposed along third side 14. In this way, when straightening tension is applied to both first and second sides 13 and 15, deformation of third side 14 is prevented. As best seen in FIG. 6, the support member may be, for example, a cylindrical dowel 14*b*, captively held between handle portion 14*b* and a grip cover 14*a* stitched thereto along third side 14 by stitches 14*c*. Alternative rigid support means may of course be provided without departure from the intended scope of the invention, such as for example an external rigid grip disposed about third side 15 and running substantially a length thereof, the rigid grip being optionally of a shape conformably configured to that of a gripping hand.

Although the precise values of the various included angles of the triangular handle configuration are not essential to the invention, the triangle is advantageously configured as a substantially isosceles triangle, third side 14 comprising the base portion. "Substantially isosceles" is defined as having base angles D and D' differing from one another by no more than about 10°. Such configuration permits substantially equal distribution of tensioning forces through each of first and second forwardly disposed sides 13 and 15 when the grip region is oriented substantially perpendicular with an axis A of leash running portion 12*a*, and is thought to provide enhanced comfort as a result during use.

Figure 7:
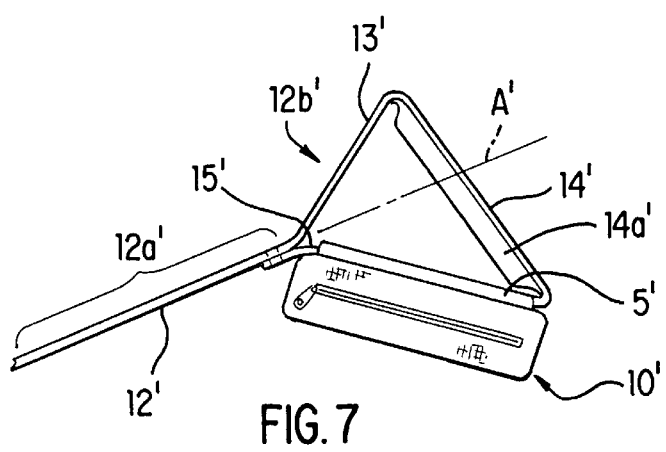
FIG. 7 is a side view of an article receptacle and leash combination depicting an alternative handle portion embodiment in accordance with the invention, in which the receptacle is mounted to the leash handle portion.

To further illustrate the many possible configurations embodied within the intended scope of the invention, FIG. 7 illustrates a leash 12' including a triangularly configured handle portion 12*b*', made in accordance with the above mentioned guidelines, wherein a third side 14' and a grip cover 14*a*' stitched thereto collectively define a grip portion which is not oriented substantially perpendicular to an axis A' of leash running portion 12*a* when substantially equal forces are generated in first and second forwardly disposed sides 13' and 15'. In addition, the embodiment as depicted in FIG. 7 differs from that of FIG. 5, in that a receptacle 10', of the type described with respect to FIG. 2 is permanently mounted to handle portion 12*b*' along second side 15'.

Figure 8:
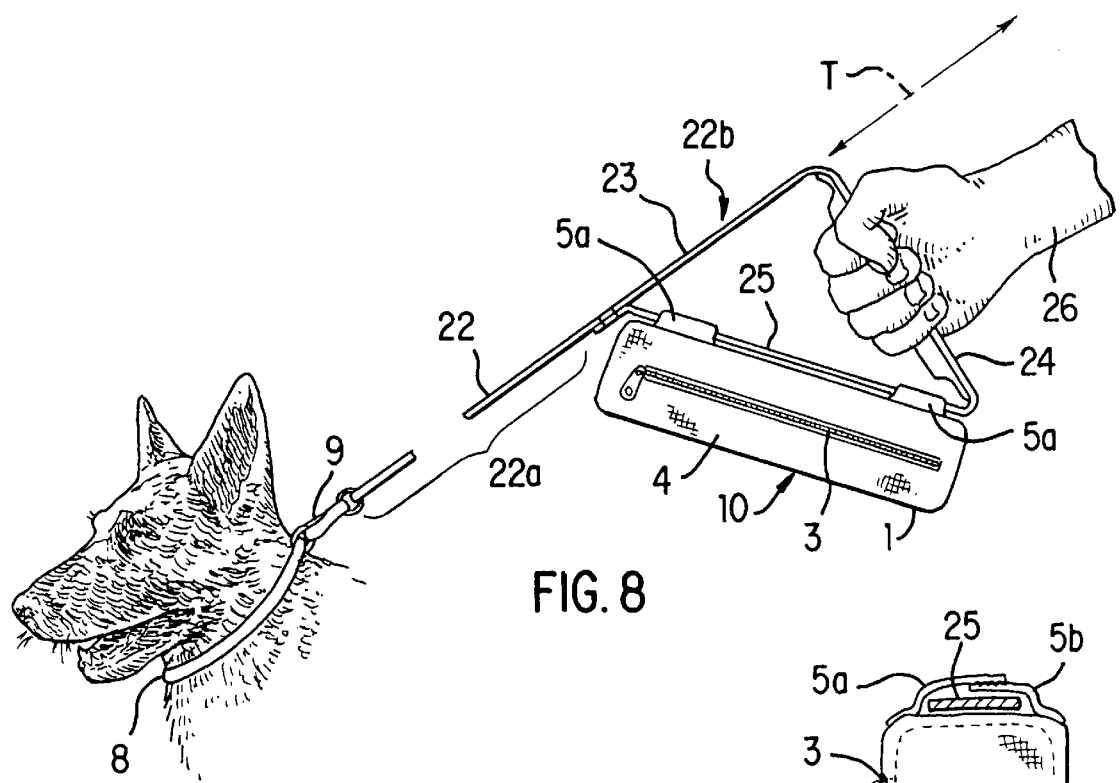
FIG. 8 is a perspective view of an article receptacle and leash combination depicting another advantageous handle portion embodiment in accordance with the invention, in which the receptacle is mounted to the handle portion.
Figure 9:
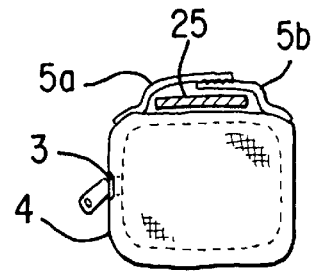
FIG. 9 is an end view shown in partial cross-section of the embodiment of FIG. 3.
Figure 10:
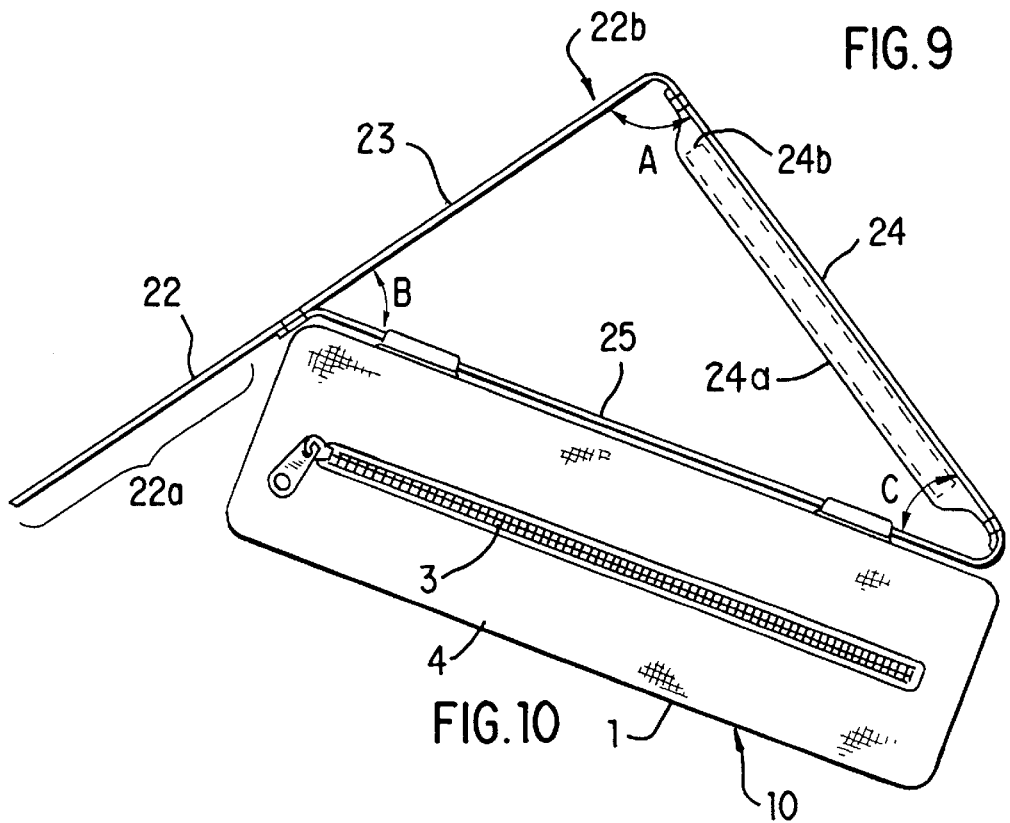
FIG. 10 is a side view of the embodiment of FIGS. 8 and 9 detailing construction and angular configuration of the leash handle portion.

Referring now to FIGS. 8–10, an embodiment in accordance with the invention is shown in which receptacle 10, generally configured as described with respect to FIG. 1, is mounted to a leash 22 at a handle portion 22*b*. Leash 22 includes a running portion 22*a* extending between a collar 8, to which it is detachably connected at one end by swivel catch 9, and handle portion 22*b* disposed at an opposite end thereof. Handle portion 22*b* is triangularly configured, including a forwardly disposed side 23 extending from running portion 22*a* of leash 22. A rearwardly disposed side 24 adjacent forwardly disposed side 23 defines a gripping region. As previously described, grip region is conveniently comprised of a dowel 24*b* (shown dotted), and a grip cover 24*a* stitchably attached to rearwardly disposed side 24. Elongated receptacle 10 is mounted to handle portion 22*b* along a remaining, receptacle attachment side 25 connecting the ends of forwardly and rearwardly disposed sides 23 and 24, receptacle body portion 1 being optimally oriented longitudinally with respect to receptacle attachment side 25 and advantageously running the length thereof as depicted. As described with regard to a prior embodiment, receptacle 10 is conveniently of pouch-like soft construction, which includes zippered entry 3 disposed on side 4 facing the free hand of the user, which in the illustrated example is the left hand. As best seen in FIG. 9, overlapping tabs 5*a* and 5*b* hold body portion 1 to receptacle attachment side 25 of handle portion 22*b*, and by virtue of their location near the ends of body portion 1, advantageously prevent separation of body portion 1 from receptacle attachment side 25, thereby providing optimized stability and further preventing substantial longitudinal movement of body portion 1 along receptacle attachment side 25 of leash handle portion 22*b*.

As shown in FIG. 10, handle portion 22*b*, being of triangular configuration includes three angles A, B and C. Values of each of angles A, B and C are not critical to the invention, however, in an advantageous embodiment as depicted in the figure, angle A is substantially a right angle. As noted earlier herein, for disclosure purposes, "substantially right" and "substantially perpendicular" define an angular relationship in a range from about 80° to about 100°. This configuration is believed to confer superior handling comfort, greater functional stability and resistance against receptacle deformation by virtue of the force-directing geometry of handle portion 22*b*. With arm extended and wrist held straight, the hand in gripped position, a line formed by the gripping fingers is substantially perpendicular to the line formed by the extended arm. Therefore, by holding handle portion 22b with forwardly disposed side 23 aligned with leash running portion 22a to form a linear extension thereof as shown, tension in running portion 22a of leash 22 is transmitted primarily through extended forwardly disposed side 23, to the gripped rearwardly disposed side 24 oriented at a substantially right angle therewith. Held in such position, an extended arm of the user 26 is in general alignment with a vector of tensioning forces T extending through running portion of leash 22. Because receptacle attachment side 25 is under significantly less tension than forwardly disposed side 23 when so positioned, such configuration is thought not only to provide greater comfort, but also to provide resistance against significant deformation of the pouch, should the direction of applied tension be shifted by a change in the direction of the dog, or a twisting motion of the handle portion effected by the user.

It is noted that in one of its variations, the above described triangular configurations of the leash handle portion provide convenient means for orienting the grip region thereof substantially perpendicular with tensioning forces generated in the running portion of the leash. However, it will be understood that other alternate geometric configurations may be used to accomplish this end, and are contemplated within the scope of the invention. For example, the handle portion may be comprised entirely of rigid material, having a rectangular shape, and a one side thereof providing a grip region. A side of the rectangle opposite the grip region could then be fastened in suitable manner to the end of the running portion to maintain the grip region in desired angular relationship therewith.

It is further noted, that the size of the receptacle, and the exact materials of its construction and/or of the leash to which it is mounted are not critical within the contemplated scope of the invention. As a general consideration, however, it is advantageous that the materials selected provide sufficient strength and durability, and that if comprised of, for example woven fabric, such materials possess desirable rigidity with respect to the size of the receptacle to provide proper aesthetics and resistance against excessive deformation. In developing the invention, an experimental version of the receptacle/leash combination was found, for example, to provide the above optimal objectives within satisfactory guidelines. A 1" nylon web, 61½" was used to fabricate the leash, the handle portion of which is triangularly configured and includes a 4" wood dowel having a ⅜" diameter, captively held in place by a length of 1½" poly web serving as a handle cover, stitched to the handle portion of the leash. A 1" nickel catch is disposed at the other end of the leash. The receptacle is of elongated, soft pouch-like configuration, made of 1000 denier nylon cordura, fabricated by stitching two 2⅝" diameter end circles and a body panel 7½" by 7½", rolled to form an approximately cylindrical structure with the end circles disposed at opposite ends thereof, the final receptacle form measuring approximately 7½" long and 2⅜" in diameter. The receptacle is held in permanently mounted engagement to the handle portion of the leash by a 5¼" long strap holder of 1½" poly web. A slot runs the length of the receptacle defined by the ends of the body panel which are brought together to form the approximately cylindrical shape thereof. An 8" 5c coil YKK self repairing zipper stitched between the slot permits selective entry to the receptacle interior. The above example is included for illustrative purposes only, and should not be construed in a manner limiting the scope of the invention in any way.

Having described preferred embodiments of the invention with reference to the accompanying drawings, it is to be understood that the invention is not limited to those precise embodiments, and that various changes and modifications may be effected therein by one skilled in the art without departing from the scope of the invention as defined in the appended claims.

What is claimed is:

1. In an animal restraint comprising a running portion, an end of which is engagable with a collar of an animal, and a handle portion disposed at a remaining end of said running portion, the combination with an article receptacle comprising:

a body portion having a space for holding articles and including means for accessing said space;

means for mounting said body portion on said restraint with said body portion disposed in a position thereal-ong permitting user access to said articles with one hand while said user is gripping said handle portion with a second hand, said mounting means inhibiting substantial movement of the body portion on said restraint, thereby facilitating user one-handed accessing of said articles; and substantially the entire body portion being mounted at said handle portion in a position spanning a portion of said handle portion, a remaining portion of said handle portion not spanned by said body portion providing a grip region over at least a portion thereof, the length of said remaining portion being substantially greater than a distance between a junction of said remaining end and said handle portion, and an end of said body portion closest to said junction.

2. In an animal restraint comprising a running portion, an end of which is engagable with a collar of an animal, and a handle portion disposed at a remaining end of said running portion, the combination with an article receptacle comprising:

a body portion having a space for holding articles and including means for accessing said space;

means for mounting said body portion on said restraint with said body portion disposed in a position thereal-ong permitting user access to said articles with one hand while said user is gripping said handle portion with a second hand, said mounting means inhibiting substantial movement of the body portion on said restraint, thereby facilitating user one-handed accessing of said articles;

said handle portion including a grip portion;

said handle being triangularly configured, a first and a second side thereof diverging from said remaining end of said running portion, and a third side including said grip portion; and said body portion is mounted to said handle portion, received on one of said first and second sides.

3. The combination according to claim 2, wherein:

said grip portion is rigid, and extends substantially the length of said third side.

4. The combination according to claim 2, wherein:

an angle described between said first and said third sides is substantially a right angle.

5. The combination according to claim 2, wherein:

an angle described between said first and said third sides being substantially a right angle; and said body portion is received on said second side.

6. The combination according to claim 5, wherein:

a forward included angle between said first and second sides is substantially equal to a rear included angle between said second and third sides.

7. The combination according to claim 5, wherein:

a forward included angle between said first and second sides is greater than a rear included angle between said second and third sides.

8. In an animal restraint, a handling feature comprising:

a continuous length of material comprising a running portion and a handle portion disposed at a one end thereof, said handle portion being defined by a looped end portion of said material, a terminal end of which is fastened by separate securing means to said leash material a distance from said terminal end;

said handle portion including a grip portion;

said handle being triangularly configured, a first side being a contiguous extension of said running portion, a second side extending a distance from said terminal end, and a third side disposed between said first and second sides; and an angle described between said first and said third sides is substantially a right angle, whereby when said grip portion is held in an extended arm of a user, as tensioning forces are applied to said running portion, said tensioning forces are transmitted primarily through said first side, whereby a resultant reduction in an amount of force transmitted across a union between said terminal end and said leash material to which it is fixed to define said handle portion inhibits separation of said union.

9. The handling feature according to claim 8, wherein:

said grip portion is rigid, and extends substantially the length of said third side.

* * * * *